(No Model.) 3 Sheets—Sheet 2.

N. W. HOLT.
DUST COLLECTOR.

No. 338,639. Patented Mar. 23, 1886.

Witnesses
J. C. Turner
C. W. Sommers

Inventor
Noah W. Holt
By his Attorney
Doubleday and Bliss (No Model.) 3 Sheets—Sheet 3.
N. W. HOLT.
DUST COLLECTOR.
No. 338,639. Patented Mar. 23, 1886.
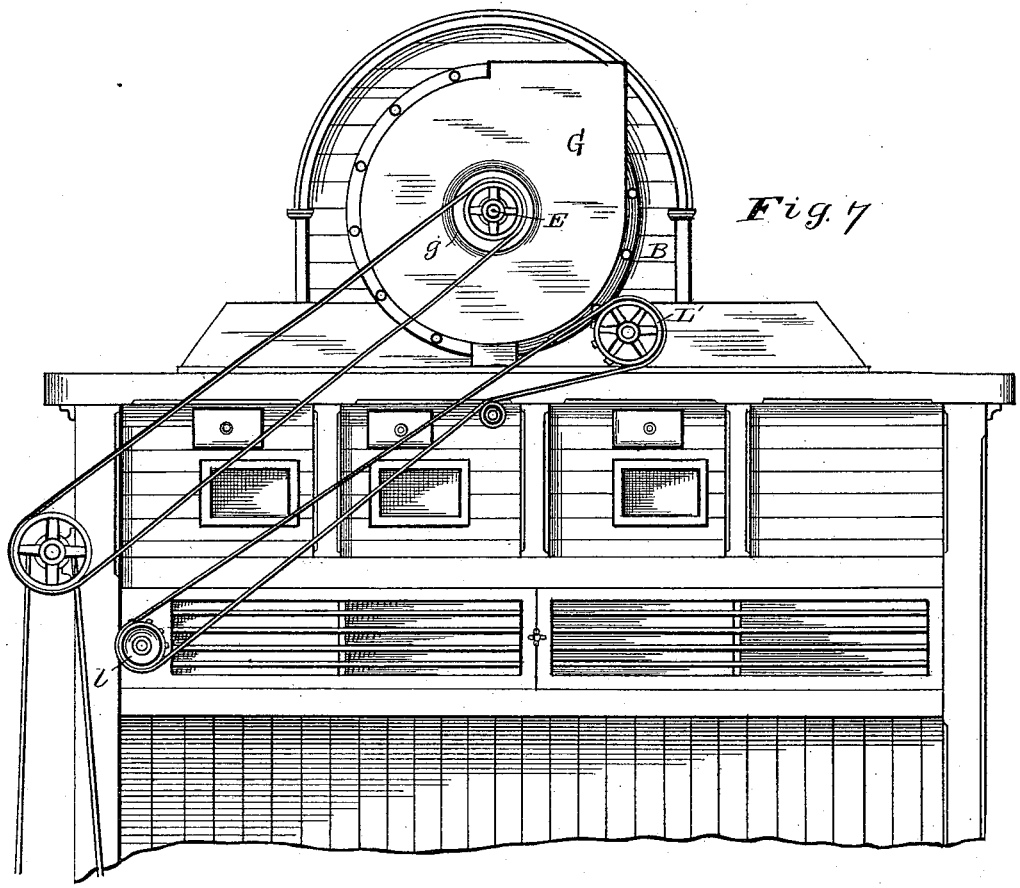
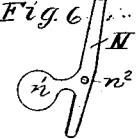
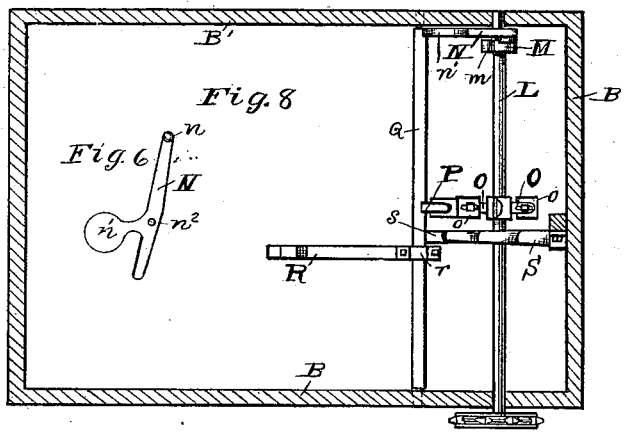
Witnesses:
J. C. Turner
J. S. Barker.
Inventor:
Noah W. Holt
Doubleday & Bliss
attys.

UNITED STATES PATENT OFFICE.

NOAH W. HOLT, OF JACKSON, MICHIGAN, ASSIGNOR TO THE GEORGE T. SMITH MIDDLINGS PURIFIER COMPANY, OF SAME PLACE.

DUST-COLLECTOR.

SPECIFICATION forming part of Letters Patent No. 338,639, dated March 23, 1886.

Application filed November 21, 1885. Serial No. 183,553. (No model.)

*To all whom it may concern:*

Be it known that I, NOAH W. HOLT, a citizen of the United States, residing at Jackson, in the county of Jackson and State of Michigan, have invented certain new and useful Improvements in Dust-Collectors, of which the following is a specification, reference being had therein to the accompanying drawings.

Figure 1:
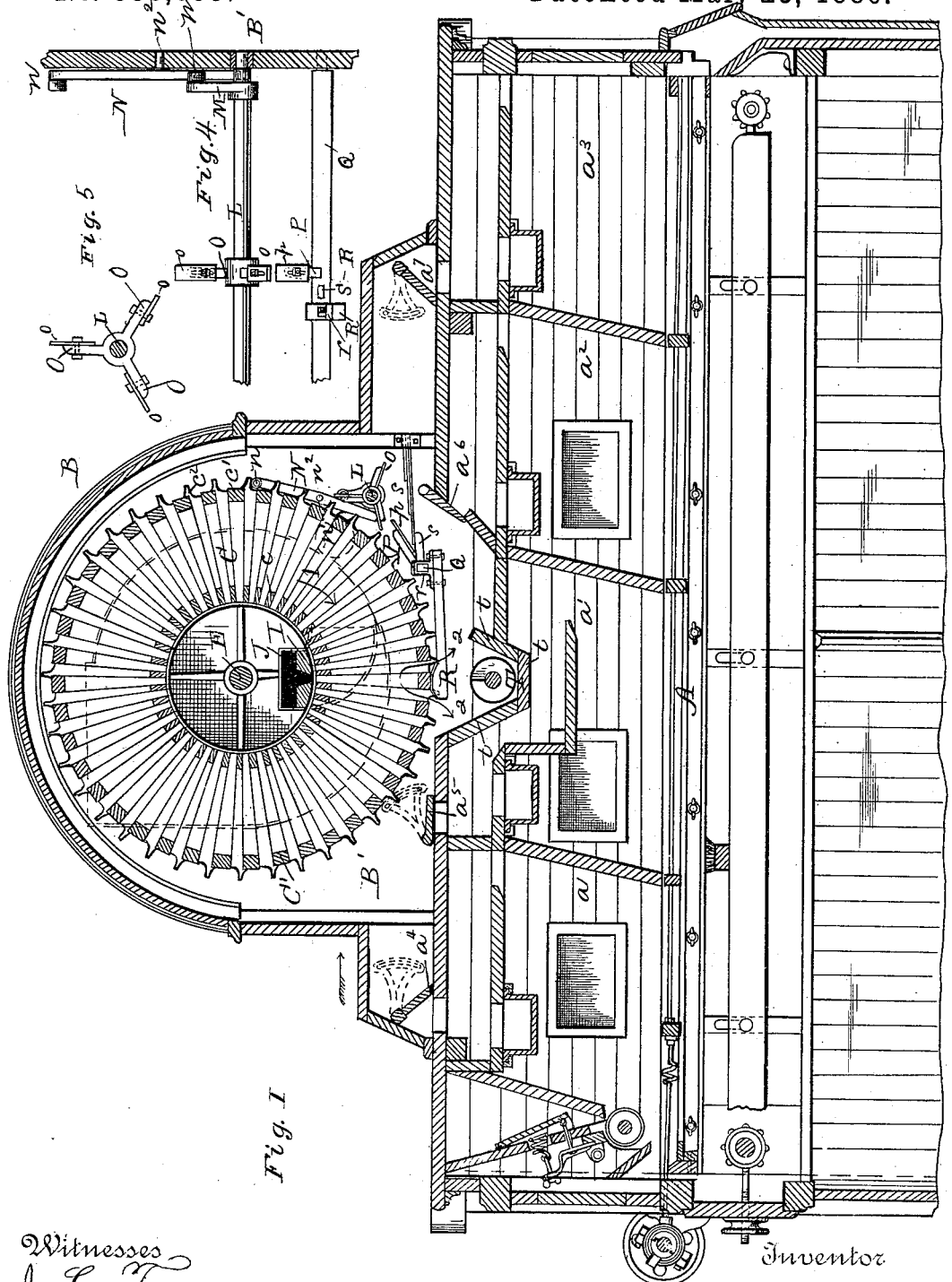
Figure 2:
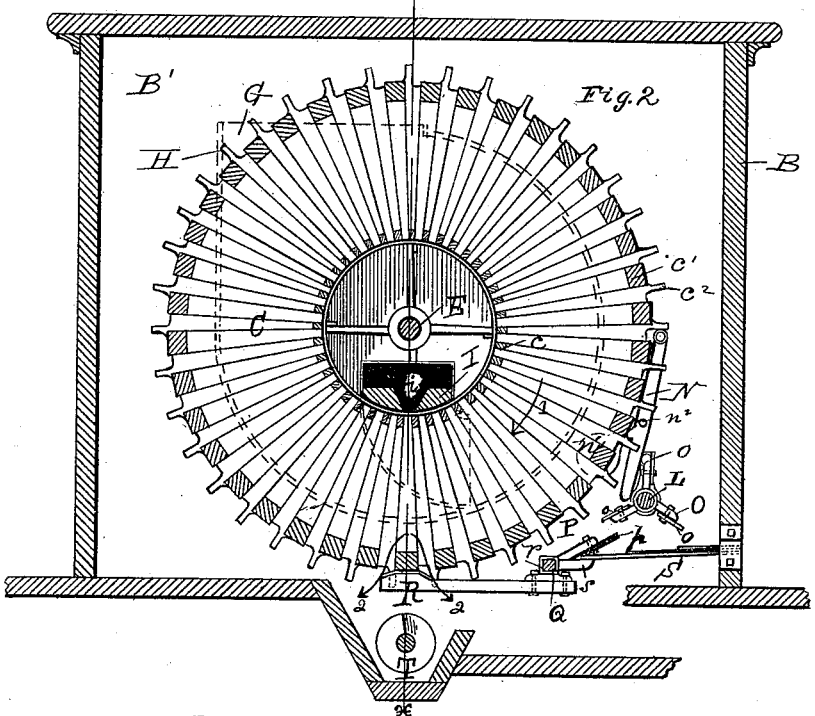
Figure 3:
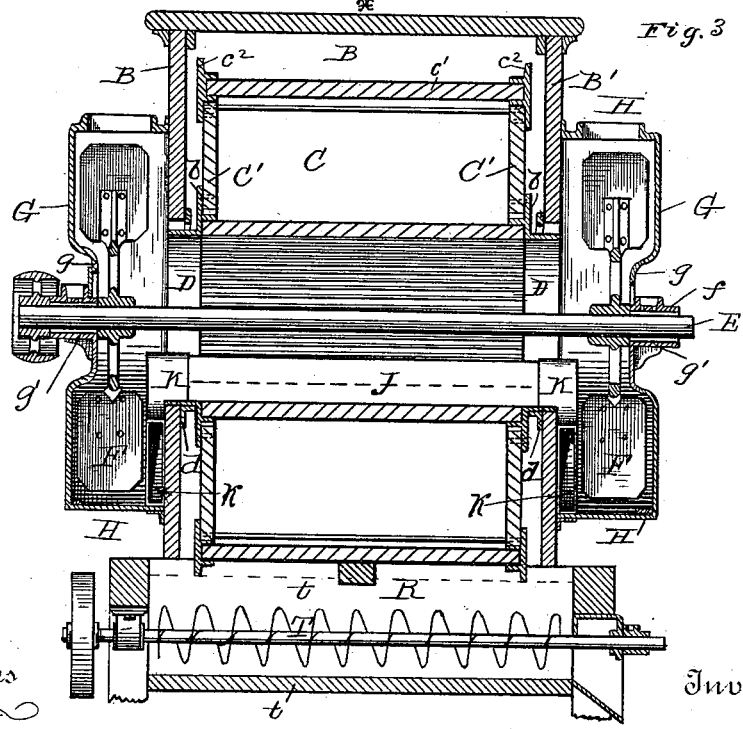

Figure 1 is a central vertical section of a part of a middlings-purifier having my improvements applied thereto. Fig. 2 is a central vertical section of a dust-collector containing my improvements. Fig. 3 is a vertical section on line $x\ x$, Fig. 2. Fig. 4 is a detached view, enlarged, taken transversely of the purifier and longitudinally of the dust-collector, showing the construction and arrangement of devices for rotating and jarring the balloon. Figs. 5 and 6 are details. Fig. 7 is a side elevation of Fig. 1 on reduced scale. Fig. 8 is a plan view of rotating and jarring devices.

One part of this invention relates to the combination of a dust-collector with a middlings-purifier. Other parts relate to the construction of the dust-collector itself, all of which will be hereinafter fully explained.

The invention relates to that class of machines illustrated in a patent, No. 273,533, granted to me March 6, 1883, in which certain sections of the balloon-shaped filter are "isolated" by means of a cut-off, which, as the balloon is rotated, prevents the air being drawn through the filter-cloth toward the center of the balloon of such sections as are temporarily below the cut-off, and that part of the invention has for its object the more effectual removal of the dust from the outer surface of the filter-cloth upon those isolated sections.

In the drawings I have shown my invention as applied to a middlings-purifier described and shown in Patent No. 330,746, granted Charles A. Smith, November 17, 1885, and I have shown so much of such purifier as is necessary to illustrate my invention and refer to said Smith patent for a fuller description thereof.

Similar letters of reference indicate like parts in all the figures.

A is the shaker. $a\ a'\ a^2\ a^3$ are air-chambers located above the shaker, and $a^4\ a^5\ a^6\ a^7$ are valves or dampers arranged in the wind-trunk, which connects the air-chambers with the dust-collector to regulate the strength of the air-currents through different parts of the bolt-cloth on the shaker.

B is the casing at the top of the purifier and air-trunks, the central part of which is elevated and preferably curvilinear in outline in cross-section.

B' B' are the ends or sides of that part of the casing which incloses the balloon of the dust-collector, and which is commonly called the "housing."

C represents, generally, the balloon, which may be of any usual or preferred construction, adapted to have my improvement applied thereto.

The cloth is arranged in zigzag form, being atttached to two concentric series of cloth-bars, $c\ c'$, which are supported at their ends in centrally-open heads C' C', provided at their peripheries with radially-projecting spurs $c^2$, the outer rings or flanges from which these teeth project being preferably of cast metal. The balloon is supported upon hollow trunnions D D, which project outward from the centrally-open heads and rest upon semicircular flanged bearing-plates $d\ d$, which are bolted firmly to the casing-walls B' B'.

$b\ b$ are semicircular packing ribs or plates, attached to the side casing-walls to prevent leakage.

E is the fan-shaft, carrying fan-blades F F. The fan-shaft is mounted in bearings attached to or cast integrally with the fan-casings G H. Each of these casings consists, essentially, of a vertical plate or wall, G $g$, and a shell, H, of which the part $g$ is, by preference, in a different plane from the part G, and is inside of the part G, in order that the bearings, the lower part $g'$ of which is cast integrally therewith, may not project much, if at all, beyond the plane of the part G.

When preferred, the part $f$ of the bearing may be cast separate from the part $g'$, and bolted thereto, as is common with separable boxes or bearings. The bearings may be Babbitted. The part H may be cast integral with the part G or it may be made separate and attached thereto.

By preference, the mouths of the fans open upward, as indicated by dotted lines, Figs. 1 and 2.

The cut-off consists of a slotted base, I i, extending the entire length of the balloon and of such width as to cover the inner ends of the requisite number of sections or compartments, and an air-tube, J K K, of which the ends, K K, extend into the fan-cases and thence downward, being provided each upon one side with an opening, k, facing the advancing fan-blades, which are driven in the direction of the arrows 1, Figs. 1 and 2. These fans perform a twofold function, to wit: first, they operate as suction-fans to draw a current of air through the balloon, except the isolated sections, and they also act as blast-fans to force a current of air through the isolated sections in the direction indicated by arrows 2, Figs. 1 and 2.

I am aware that it is not new to employ a back-draft—that is, a reversed air-current—through isolated sections of the filter-cloth to assist in removing adhering dust, nor to employ a blast from a pressure-fan for that purpose; but I believe I am the first to use an air-tube which at one or both ends projects through the hollow trunnion which supports the balloon, thence directly down into the fan-case, and is provided with an opening which faces the advancing fan-blades near the periphery of the fan-case and wholly inside of such fan-case, so that the latter may be entirely imperforate except at the eye of the fan and at the mouth through which the air is driven and escapes into the open air of the mill.

$a^4$ $a^5$ $a^6$ $a^7$ are "dampers," by means of which the strength of the air-current can be regulated through different parts of the shaker, and it will be readily understood that the rapidity and depth with which the filtering-cloth of the balloon will become covered with dust, and the consequent resistance to the passage of air through the balloon will vary according to the quantity, quality, and condition of the material which is passing over the shaker, and that therefore the necessity for changing the areas of the openings by means of the valves or dampers may be very different from that which would exist or occur in purifiers which are used without dust-collectors. So, also, the combination, with a purifier, of a dust-collecting balloon, arranged immediately above the central part of the shaker, will materially modify the action of the fan in producing upward air-currents through the shaker, it being apparent that the air-current will be relatively stronger through that portion of the filter-cloth from which the dust has recently been removed than it will be through the opposite side of the balloon, which has a much heavier coating of dust upon its outer surface, this being particularly the case when the downward-moving side of the balloon is toward that end of the shaker from which the greater amount of dust is being taken by the air-current and deposited upon the filter-cloth. Again, it is obvious that under some circumstances the strength of the air-current through the shaker will be modified to some extent by the action of the blast air-current through the slotted cut-off, or "back-draft" air-tube, as it is sometimes called. Thus there is an increased necessity for the combination, with the balloon of the dust-collector and the shaker, of a valve or damper for regulating the air-current.

I am aware of Patents Nos. 311,295 and 327,825; but it is evident that my invention could not be applied to the latter of these, because its fan-blades are so arranged upon planes which are at angles to their plane of rotation that when in operation there is a partial vacuum at all points within the fan-case between the blades and the balloon. Therefore in Richardson it is indispensable that his air-tube must be located upon the extreme outer vertical side of the fan, with its open side or mouth facing the balloon and in a plane parallel with the end of the balloon; whereas in my machine, in consequence of the fan-blades being arranged in planes which are parallel to planes intersecting the ends of the balloons and at right angles thereto, there is a pressure of air between the blades and the balloon-heads at the points occupied by the mouths of the air-tubes K. In consequence of this relation of parts the mouths of my tubes do not face the ends of the balloons, but are in planes at right angles to the balloon-heads. So, also, my construction has marked advantages over that shown in No. 311,295, in that, among other things, much less length of tube is required, the tubing is wholly within the inclosing-walls of the machine, including the fan-casings, and no connection is required to be made between the air-tube and the casing of the fan. No elbows or other connections are required, except the one which connects the parts K K, and the resistance offered by such elbows to the passage of the air-currents through the tubes and around elbows is almost entirely obviated.

I will now describe the devices which I have invented for advancing the balloon in its rotation by a step-by-step movement and for jarring the filter-cloth of the isolated section.

L is a rotating shaft, mounted in bearings attached to the casing, and driven by a belt passing over a pulley, L', of said shaft and a pulley, l, of the purifier.

M is an arm keyed to shaft L in the plane of rotation of the spurs $c^2$, and adapted to engage therewith in such manner that at each revolution of the shaft the balloon is rotated one tooth.

N n is a detent pivoted at $n^2$ to the casing, so that the spur n also projects into the plane of rotation of the spurs $c^2$, and when in normal position engages therewith to prevent accidental rotation of the balloon. The counterpoise or weight n' is, by preference, integral with the other parts of the detent, and holds the detent in normal position, except that a lug, m, on the arm M, engages with the lower end of the detent and withdraws the spur n from the spurs $c^2$ at the time that the arm M is moving the balloon.

O O O are spider-arms keyed to rotating-shaft L, and engage successively with an arm, P, which projects into their path from rock-shaft Q, which is also supported from the casing. Both the shafts L and Q are parallel with the axis of the balloon. The arms O O O P are faced with adjustable wearing-plates o and p, secured thereto by means of bolts or set-screws, which pass through slots in the plates and thence into the arms.

In addition to reducing the friction and increasing the durability of parts, the extent to which rock-shaft Q is oscillated may be varied by adjusting either of these plates toward or from their respective shafts, and when a plate is worn out it can be readily replaced.

R is a knocker, one end of which is bolted to a clip, r, which is mounted on the rock-shaft Q.

s is an arm projecting from shaft Q, and with this arm engages the free end of a returning spring, S, which, as indicated, may be made of two or more leaves.

It is apparent that as the shaft L rotates the balloon will be advanced by a step-by-step movement, and at the same time the shaft Q will receive an oscillating movement, and that the knocker will strike the cloth-rib immediately above it three blows for each rotation of the shaft L. It will also be seen that although the arms O O O are at equal distances apart, and the arm M is in line with one of the arms O, yet the relative positions of the rotating-shaft, the oscillating-shaft, and the devices connected therewith is such that the series of blows of the knocker occur while the balloon is at rest.

By the employment of the rotating shaft I am enabled to arrange the arms O O P S at points about midway between the ends of the rock-shaft Q, and apply the spring S at the same point, which I have found to be much more advantageous than arranging these parts or corresponding parts outside of the casing of the machine. It will also be understood that it is very desirable to form the spurs $c^2$ upon the periphery of the head C', instead of forming them upon the flat outside face of such head, because it enables me to arrange the detent between the head and the end wall of the housing and actuate said detent by a spur or lug projecting laterally from the side of the arm M.

T is a conveyer, arranged in conveyer-box t t t, located in the wind-trunk and below the top of the deck or upper casing-wall of the purifier. The employment of this conveyer, in combination with the balloon, the suction-fan, the air valve or valves, and other parts of the purifier, is desirable, because it enables me to examine the material taken out by the air current or currents and determine the character of such material within a very short time after it has been deposited upon the filter-cloth, so that in case I discover an undue waste of good material I can regulate the strength of the air-currents accordingly; and it will also be seen that part of the balloon itself is located in the wind-trunk and projects down to about the line of the deck of the purifier. This construction and arrangement of parts economizes not only space but material and labor without seriously interfering, if at all, with a satisfactory control of the direction and strength of the air-currents.

I do not in this case claim the combination of the dust-collector with the purifier, nor the combination, with the dust-collector and the shaker, of the purifier of the interposed air-chambers, wind-trunks, or valves, or either of them, reserving to myself the right to claim such subject-matter in another application which I propose to file as a division of this case.

The inventions which I propose to claim herein are those which relate to the devices for controlling the movements of the balloon in its rotation, those for clearing the filter-cloth, and those for producing air-currents through the filter-cloth of the balloon. All of these last referred to devices are capable of being used in a dust-collector, whether the same be combined with a middlings-purifier or not.

What I claim is—

1. The combination, with the balloon and its casing, of the fans, the fan-casings, and the slotted air-tube having its ends projecting into the eyes of the fans and thence toward and within the peripheries of the fan-casings, the ends of the tube being open to receive the blast from the fans, and the fan-casings being imperforate except at the eyes and mouths, substantially as and for the purpose set forth.

2. In a dust-collector, the combination, with the balloon having the radially-projecting spurs $c^2$, of the rotating through-shaft L, the arm M, adapted to engage with the spurs $c^2$, the detent arranged between the end of the balloon and the casing, and the lug on the arm M, adapted to actuate the detent, substantially as set forth.

3. In a dust-collector, the combination, with the balloon having the radially-projecting spurs $c^2$, of the rotating shaft L, the arm M, adapted to engage with said projecting spurs, the rock-shaft, the knocker mounted centrally of the rock-shaft, the arms O O, mounted centrally of the rotating shaft, the arms P s, and the returning spring S, also arranged centrally of the rock-shaft, substantially as set forth.

In testimony whereof I affix my signature in presence of two witnesses.

NOAH W. HOLT.

Witnesses:
GEO. S. BENNETT,
WM. H. DICKEY.